(12) United States Patent
Kim et al.

(10) Patent No.: US 10,457,790 B2
(45) Date of Patent: Oct. 29, 2019

(54) METHOD OF MANUFACTURING POLISHING PAD

(71) Applicant: KPX CHEMICAL CO., LTD., Seoul (KR)

(72) Inventors: Seung-Geun Kim, Hwaseong-si (KR); Hak-Su Kang, Hwaseong-si (KR); Jeong-Seon Choo, Suwon-si (KR); Dae-Han Jung, Changwon-si (KR); Gi-Young Park, Changwon-si (KR)

(73) Assignee: KPX CHEMICAL CO., LTD., Seoul (KR)

( * ) Notice: Subject to any disclaimer, the term of this patent is extended or adjusted under 35 U.S.C. 154(b) by 215 days.

(21) Appl. No.: 15/534,828

(22) PCT Filed: Apr. 6, 2016

(86) PCT No.: PCT/KR2016/003562
§ 371 (c)(1),
(2) Date: Jun. 9, 2017

(87) PCT Pub. No.: WO2017/175894
PCT Pub. Date: Oct. 12, 2017

(65) Prior Publication Data
US 2018/0118908 A1    May 3, 2018

(51) Int. Cl.
*B24B 37/24* (2012.01)
*C08J 9/06* (2006.01)
(Continued)

(52) U.S. Cl.
CPC ............... *C08J 9/06* (2013.01); *B24B 37/24* (2013.01); *B29C 44/3415* (2013.01);
(Continued)

(58) Field of Classification Search
CPC ......... B24B 37/24; B29C 44/56; C08G 18/00; C08L 75/00
See application file for complete search history.

(56) References Cited

U.S. PATENT DOCUMENTS 5,100,926 A * 3/1992 Kondo ............... C08G 18/6529
521/137
5,578,362 A   11/1996 Reinhardt et al.
(Continued)

FOREIGN PATENT DOCUMENTS

JP    2004-330411 A    11/2004
JP    2004330411 A     11/2004
(Continued)

OTHER PUBLICATIONS

Japanese Office Action dated Aug. 7, 2018, in connection with the Japanese Patent Application No. 2017-529389.
(Continued)

*Primary Examiner* — Matthew J Daniels
*Assistant Examiner* — Wayne K. Swier
(74) *Attorney, Agent, or Firm* — Hauptman Ham, LLP

(57) ABSTRACT

A method of manufacturing a polishing pad includes producing an urethane prepolymer having a viscosity of 20,000 cps (at 25° C.) to 40,000 cps (at 25° C.) by mixing a plurality of polymers, mixing the urethane prepolymer with an inert gas and a low-boiling blowing agent having a boiling point of 60° C. to 150° C., and manufacturing a polishing layer including porous pores by causing a mixture produced at the mixing to be subjected to gelation and curing in a predetermined cast.

6 Claims, 17 Drawing Sheets

(51) Int. Cl.
 *B29C 44/34*    (2006.01)
 *B29C 44/56*    (2006.01)
 *B29C 69/00*    (2006.01)
 *C08G 18/48*    (2006.01)
 *C08G 18/76*    (2006.01)
 *C08J 9/12*     (2006.01)
 *C08J 9/14*     (2006.01)
 *C08G 18/12*    (2006.01)
 *B29K 75/00*    (2006.01)
 *B29L 31/00*    (2006.01)
 *B29K 105/00*    (2006.01)
 *B29K 105/24*    (2006.01)

(52) U.S. Cl.
 CPC .......... *B29C 44/56* (2013.01); *B29C 69/001* (2013.01); *C08G 18/12* (2013.01); *C08G 18/4804* (2013.01); *C08G 18/4808* (2013.01); *C08G 18/4825* (2013.01); *C08G 18/4854* (2013.01); *C08G 18/4858* (2013.01); *C08G 18/7621* (2013.01); *C08J 9/122* (2013.01); *C08J 9/127* (2013.01); *C08J 9/14* (2013.01); *B29C 44/3442* (2013.01); *B29C 44/5627* (2013.01); *B29K 2075/00* (2013.01); *B29K 2105/0061* (2013.01); *B29K 2105/24* (2013.01); *B29L 2031/736* (2013.01); *C08J 2203/06* (2013.01); *C08J 2203/182* (2013.01); *C08J 2207/00* (2013.01); *C08J 2375/08* (2013.01)

(56) References Cited

U.S. PATENT DOCUMENTS

| | | | | |
|---|---|---|---|---|
| 6,331,577 B1* | 12/2001 | Volkert | ................. | C08G 18/10 521/159 |
| 8,697,239 B2* | 4/2014 | Kulp | ...................... | B24B 37/24 428/423.1 |
| 2002/0078632 A1* | 6/2002 | Hasegawa | ............... | B24B 37/24 51/298 |
| 2004/0053007 A1* | 3/2004 | Huh | ...................... | B24B 37/205 428/158 |
| 2004/0166790 A1* | 8/2004 | Balijepalli | ............... | B24D 3/32 451/526 |
| 2006/0014846 A1* | 1/2006 | Sparks | ............... | C08G 18/4018 521/155 |
| 2007/0232711 A1* | 10/2007 | Frei | ........................ | C08G 18/10 521/128 |
| 2009/0062414 A1 | 3/2009 | Huang et al. | | |
| 2013/0212951 A1* | 8/2013 | Ahn | ........................ | B24D 3/32 51/296 |
| 2013/0243986 A1* | 9/2013 | Girotti | .................... | B29C 44/10 428/36.5 |
| 2015/0133039 A1* | 5/2015 | Ahn | ....................... | B24B 37/24 451/526 |
| 2015/0375362 A1* | 12/2015 | Qian | ....................... | B24B 37/24 438/693 |

FOREIGN PATENT DOCUMENTS

| | | |
|---|---|---|
| JP | 2006-519115 A | 8/2006 |
| JP | 2008-506815 A | 3/2008 |
| JP | 2009-125894 A | 6/2009 |
| JP | 2009125894 A | 6/2009 |
| JP | 2010-082719 A | 4/2010 |
| KR | 20010002696 A | 1/2001 |
| KR | 20010055971 A | 7/2001 |

OTHER PUBLICATIONS

Japanese Notice to Grant a Patent dated Nov. 6, 2018, issued in corresponding Japanese Patent Application No. 2017-529389.
Extended European Search Report dated Sep. 9, 2019, in connection with counterpart European Patent Application No. 16858489.4, citing the above reference.

* cited by examiner

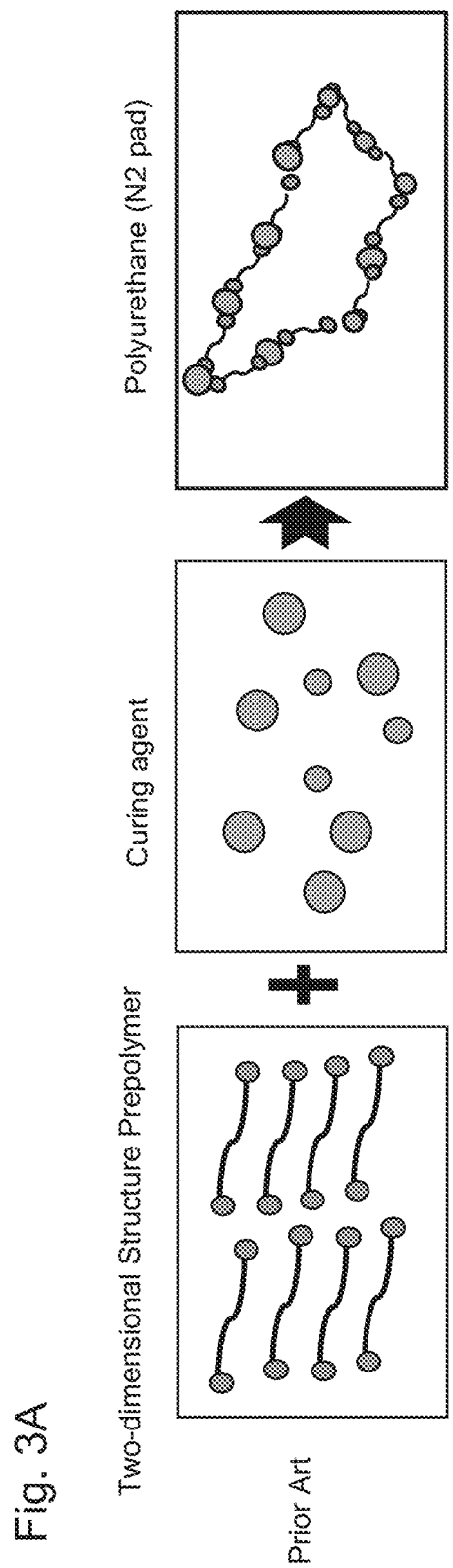

METHOD OF MANUFACTURING POLISHING PAD

CROSS REFERENCE TO RELATED APPLICATION

This present application is a national stage filing under 35 U.S.C § 371 of PCT application number PCT/KR2016/003562 filed on Apr. 6, 2016. The disclosures of the above-listed applications are hereby incorporated by reference herein in their entirety.

BACKGROUND

1. Field

The present disclosure relates to a method of manufacturing a polishing pad, and more particularly, to a method of manufacturing a polishing pad configured to collect a slurry of a predetermined size.

2. Description of the Related Art

The chemical mechanical planarization/chemical mechanical polishing (hereinafter, "CMP") process has been introduced to planarize semiconductor devices. With the tendency of increasing the wafer size, high density integration, further downsizing of the linewidth, and multilayer wiring structure, the CMP process is getting more attention in the semiconductor manufacturing process.

Polishing speed and degree of planarization are key parameters in the CMP process, which can be determined by process condition of a polishing apparatus and expendable members used in the apparatus, such as polishing slurry and polishing pad. In particular, the polishing pad evenly spreads the slurry on the wafer while being in contact with the surface of the wafer, and causes a physical removal operation by polishing particles in the slurry and surface undulation of the polishing pad.

When polishing the wafer, the surface of the polishing pad having direct contact with the wafer should cause the slurry to smoothly circulate while maintaining saturated state of the slurry on the surface thereof. To this end, techniques for forming minute holes (e.g., pores) on the surface of the polishing pad have been proposed in, for example, U.S. Pat. No. 5,578,362, Korean Patent Application Laid-Open No. 10-2001-2696, and Korean Patent Application Laid-Open No. 10-2001-55971.

In order to improve function and performance of the polishing pad in the CMP process, it matters to maintain the saturated state of the slurry on the polishing pad, and hence various grooves are formed to make a flow of the slurry on the polishing pad, and above and beyond that, the minute holes are formed on the surface of the polishing pad by opening fine porous material.

Regarding the formation of the groove, the technique has been developed with attempts of employing various patterns; however, the porous pore technique for forming the minute holes is practically limited to restricted usage of a specific pore forming method.

That is, as there are merits and demerits in the conventional pore forming method, the practical CMP process adjusts necessary process based on such merits and demerits of the pore forming method.

With demand of more minuteness and delicacy in the semiconductor process, however, the CMP process needs to develop a new porous pore forming method to support the state-of-the-art semiconductor process.

In particular, the failure to form the pore on the polishing pad with minute and constant size range cannot provide an appropriate CMP process in a technical field in which the delicacy and the minuteness are required.

For example, there is a technique for forming pores using inert gas only. However, the recent sophisticated CMP process requires the average size of pores in the polishing pad to be 31 µm or smaller and a fluctuation range thereof to be minimized. From this point of view, the above-mentioned technique of forming the pore using the inert gas only provides the average size of the pores that cannot meet such a condition.

Further, another technique for forming pores using chemical blowing agent produces pores having various sizes from several tens of micrometers to several thousands of micrometers, which is far from pores having a uniform size.

SUMMARY

According to some embodiments of the present invention, a method of manufacturing a polishing pad includes producing an urethane prepolymer having a viscosity of 20,000 cps (at 25° C.) to 40,000 cps (at 25° C.) by mixing a plurality of polymers, mixing the urethane prepolymer with an inert gas and a low-boiling blowing agent having a boiling point of 60° C. to 150° C., and manufacturing a polishing layer including porous pores by causing a mixture produced at the mixing to be subjected to gelation and curing in a predetermined cast.

In some embodiments of the present invention, with reference to the total volume of the produced composite, 5% to 40% of the inert gas and 0.1% to 10% of low-boiling blowing agent are mixed to the urethane prepolymer.

Further, in some embodiments of the present invention, the method further includes producing the urethane prepolymer by mixing polypropylene glycol having tetravalent or more functional group and forming polyurethane of three-dimensional bonding structure by mixing the produced urethane prepolymer and curing agent.

Moreover, in some embodiments of the present invention, polishing layer is processed to spread pores by opening the porous pores on the surface thereof.

BRIEF DESCRIPTION OF THE DRAWINGS

FIG. 3A is a set of schematic diagrams for illustrating a polyurethane structure produced by a conventional method;

DETAILED DESCRIPTION OF THE SOME EMBODIMENTS

Figure 1:
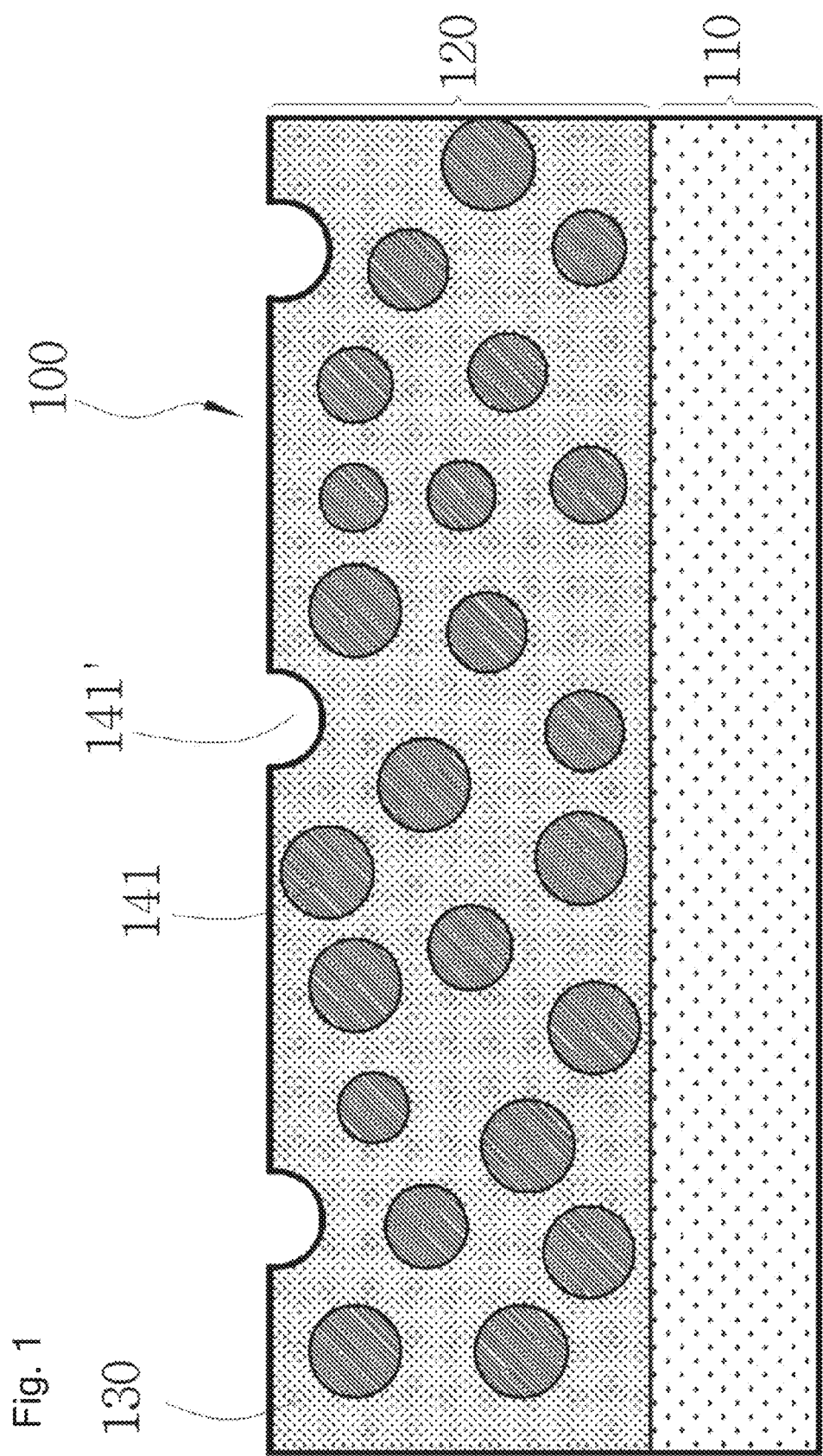
FIG. 1 is a cross-sectional view of a polishing pad according to some embodiments of the present invention.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

Figure 2:
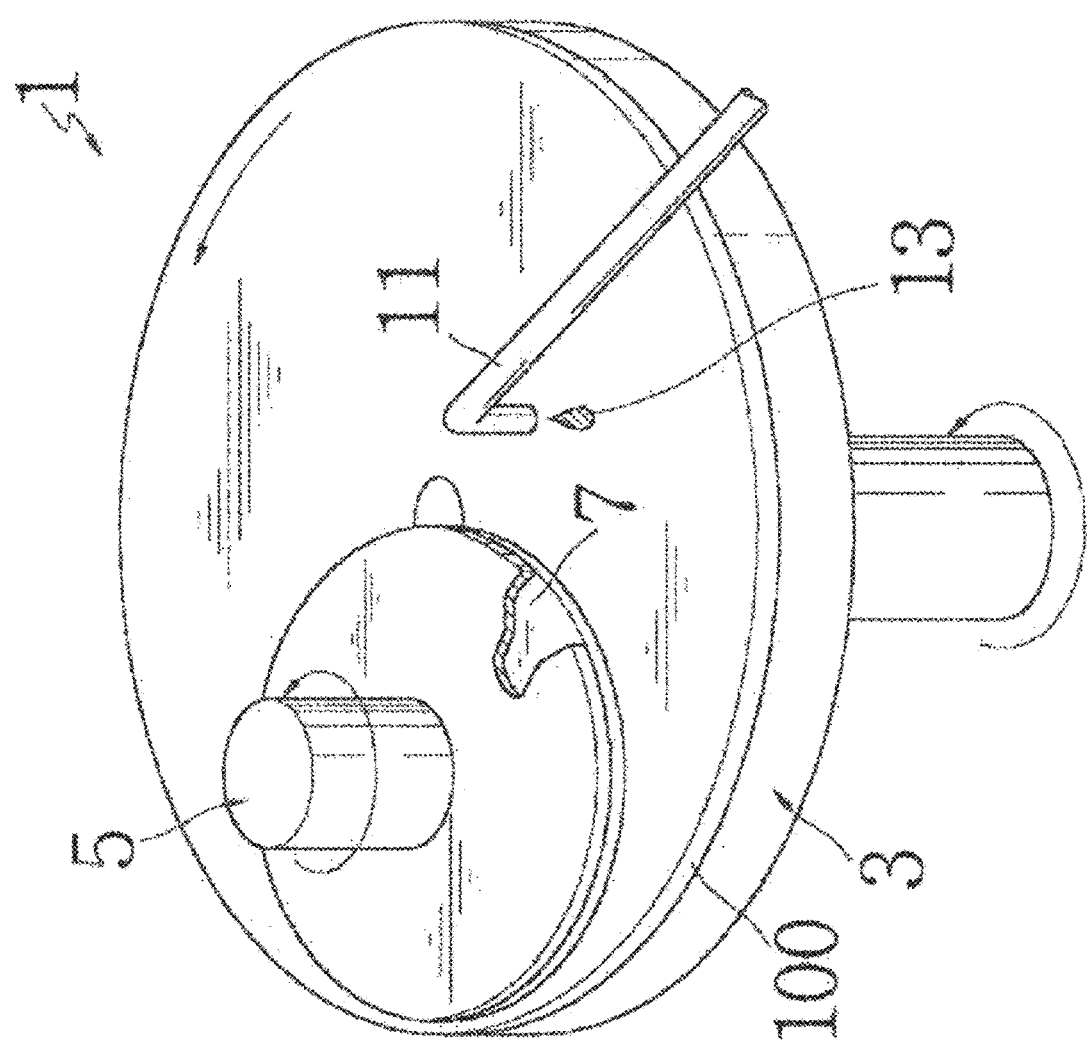
FIG. 2 is a perspective view of a polishing apparatus with the polishing pad shown in FIG. 1 attached.

FIG. 1 is a cross-sectional view of a polishing pad 100 according to some embodiments of the present invention. FIG. 2 is a perspective view of a rotating-type polishing apparatus 1 for polishing a silicon wafer 7 with the polishing pad 100.

As shown in FIG. 1, the polishing pad 100 according to some embodiments of the present invention includes a support layer 110 and a polishing layer 120.

As shown in FIG. 2, the support layer 110 is a portion that allows the polishing pad 100 to be attached to a platen 3 of the polishing apparatus 1. The support layer 110 includes a material having restorability against a force pressing the silicon wafer 7 that is a polishing target loaded on a head 5 facing the platen 3, thus supporting the polishing layer 120 formed thereon with a uniform elasticity against the silicon wafer 7.

Therefore, the support layer 110 includes a nonporous solid-state uniformly-elastic material having a hardness higher than the polishing layer 120.

Further, at least a part of the support layer 110 is transparent or translucent to allow a light beam for detecting surface flatness of a surface of the polishing target to pass therethrough.

Although the wafer 7 having a film to be polished including metal, insulating layer, and the like is instantiated as a polishing target in FIG. 2, a substrate on which a TFT-LCD is to be formed, various substrates such as a glass substrate, a ceramic substrate, a polymer plastic substrate, and the like can be used as the polishing target. In some cases, the polishing pad 100 can be fabricated without the support layer 110.

Further, although it is shown that the shape of the polishing pad 100 is circular to fit to the rotating-type polishing apparatus 1 in FIG. 2, it can be modified to various shapes such as rectangular, square, and the like depending on the type of the polishing apparatus 1.

As shown in FIG. 2, the polishing layer 120 is a portion that comes in direct contact with the wafer 7 that is a polishing target. The polishing layer 120 can be formed by mixing or chemically bonding predetermined materials to form the polishing layer 120. That is, a polymer matrix 130 that constitutes the polishing layer 120 is formed with various known materials. Explanations of the known materials and forming materials are at least partly omitted, and portions corresponding to the features of the present invention are mainly explained.

In some embodiments, the polymer matrix 130 is formed with a material that is insoluble in a polishing slurry 13 that is a chemical solution for performing the surface flatness. For example, the polymer matrix 130 can be formed with a material that is not penetrable by the polishing slurry 13 supplied through a nozzle 11 of the polishing apparatus 1 as shown in FIG. 2.

The polymer matrix 130 can be formed by chemically bonding or physically mixing materials for forming the polymer matrix.

The material for the polymer matrix include any one selected from the group consisting of polyurethane, polyether, polyester, polysulfone, polyacrylic, polycarbonate, polyethylene, polymethyl methacrylate, polyvinyl acetate, polyvinyl chloride, polyethyleneimine, polyethersulfone, polyetherimides, polyketone, melamine, nylon, fluorohydrocarbon, and any combination thereof.

A polyalkylene glycol compound can be any one selected from the group consisting of compounds obtained by doping alkylene oxide into a compound including water or active hydrogen and any combination thereof.

In some embodiments of the present invention, the polymer matrix 130 can be formed by mixing polymer (such as polypropylene glycol) having tetravalent or more functional group such as hydroxyl group. In this case, compared to the conventional case in which only polypropylene glycol having divalent or trivalent functional group is mixed, the performance of the polishing pad 100 can be enhanced in an excellent cost effective manner.

For example, when the polishing layer 120 is formed with the polyurethane, the structure of the polyurethane produced by the conventional method includes many repetitive two-dimensional bonding of ~C—O molecules as shown in FIG. 3A, exhibiting relatively flexible property.

Figure 3B:
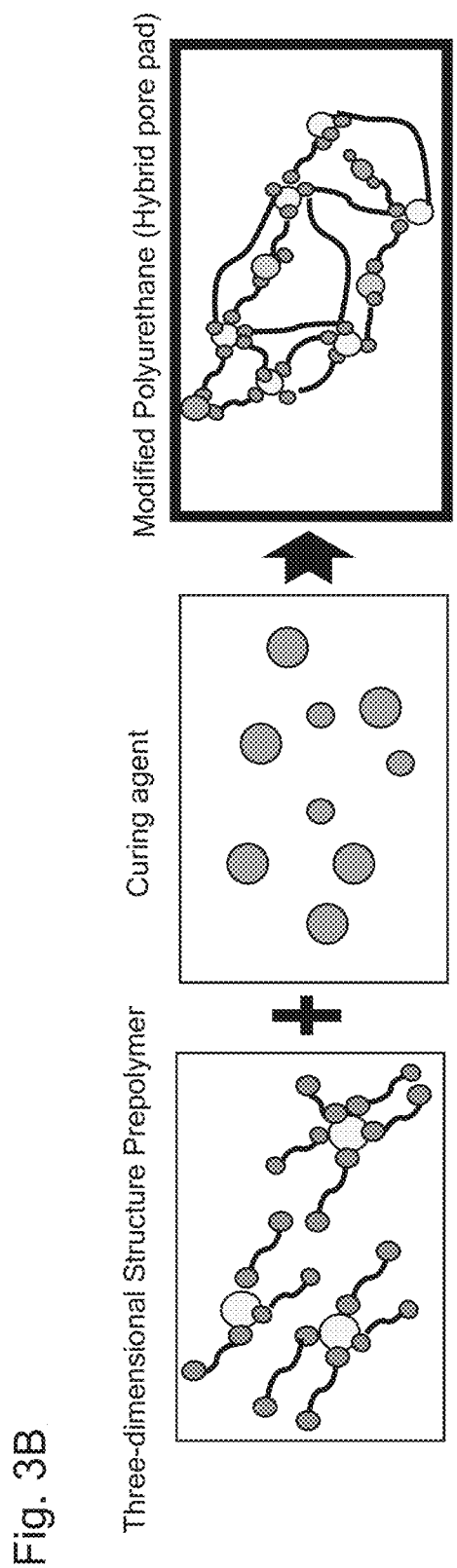
FIG. 3B is a set of schematic diagrams for illustrating a polyurethane structure produced by some embodiments of the present invention.

However, when the polyurethane is formed by mixing the polypropylene glycol having tetravalent or more functional group as in the case of the present invention (see FIG. 3B), the structure of the polyurethane includes a three-dimensional structure or a mesh structure having higher degree of cross-linkage as shown in FIG. 3B, and hence it exhibits more rigid property than the conventional case.

In some embodiments, the polymer having tetravalent or more hydroxyl group is contained by the content of 1% to 30% with respect to the weight of produced urethane prepolymer.

For example, when the urethane prepolymer is formed by mixing a polymer having divalent hydroxyl group, a polymer having trivalent hydroxyl group, and a polymer having tetravalent or more hydroxyl group, the polymer having tetravalent or more hydroxyl group is mixed with the weight ratio of 1% to 30% of the urethane prepolymer.

When the weight ratio of the polymer having tetravalent or more hydroxyl group is smaller than 1% of the whole urethane prepolymer, the three-dimensional bonding by the polymer having the tetravalent or more hydroxyl group is unlikely to be generated, and as a result, not much contribution is given to the enhancement of the degree of cross-linkage. On the other hand, when the weight ratio of the polymer having tetravalent or more hydroxyl group is larger than 30% of the whole urethane prepolymer, the physical property of the tetravalent flexible polishing member is considerably decreased, causing the corresponding urethane prepolymer to be hardly controlled physically in the process of producing the polishing layer.

Therefore, in some embodiments, the polymer having the tetravalent or more hydroxyl group is mixed by the amount of 1% to 30% of the weight of the whole urethane prepolymer produced.

A glazing phenomenon (phenomenon in which surroundings of a pore is worn due to high pressure and friction, and the pore is blocked by the urethane and smudged) is generated while the CMP process is under progress in a pore 141' area on the surface of the polishing pad 100; however, in the case of the polyurethane having the mesh structure as the present invention, the shape of the pore is constantly maintained for the lifetime of the polishing pad 100 while the CMP process is under progress.

Figure 4A:
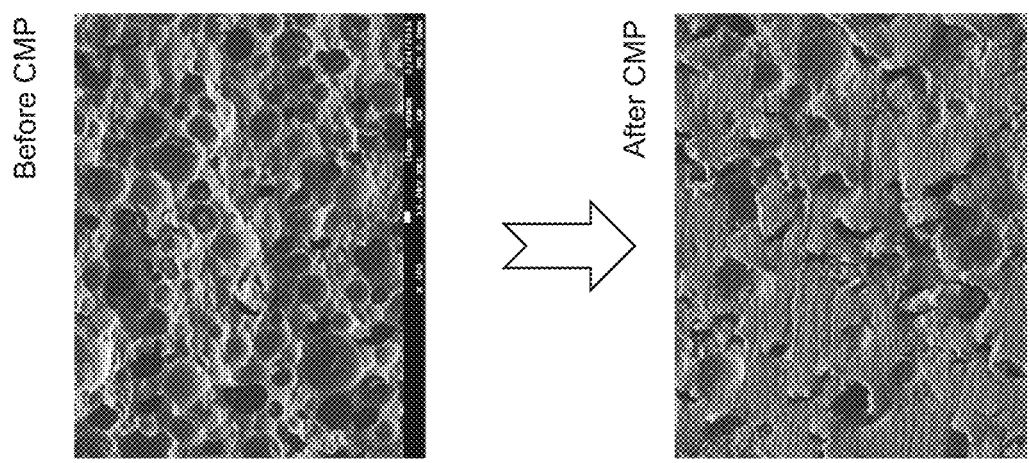
FIG. 4A is a set of images of a surface of a polishing pad manufactured by the conventional method before and after a CMP process.
Figure 4B:
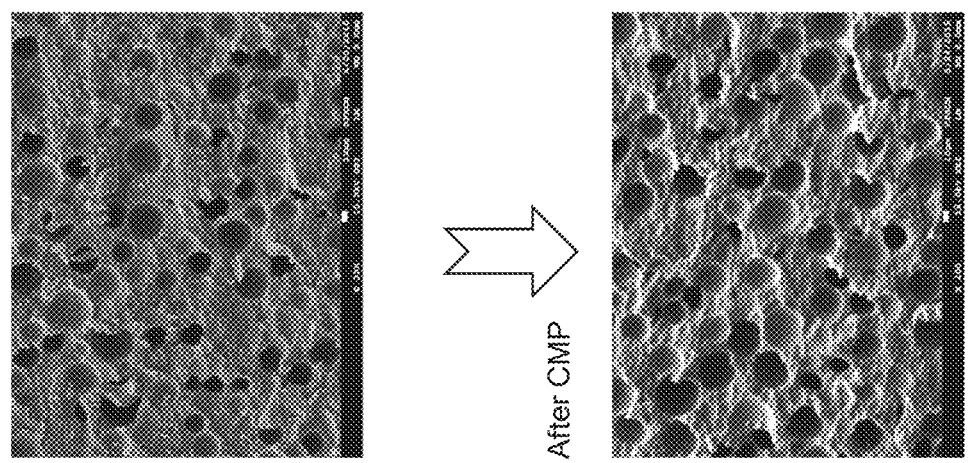
FIG. 4B is a set of images of a surface of a polishing pad manufactured by some embodiments of the present invention before and after a CMP process.

FIG. 4A and FIG. 4B show a comparison result of the effect between the conventional method and the method according to some embodiments of the present invention.

Upper image of FIG. 4A is a magnified image of the surface of a polishing pad manufactured by the conventional method before the CMP process, and lower image of FIG. 4A is a magnified image of the surface of the polishing pad manufactured by the conventional method after the CMP process.

Upper image of FIG. 4B is a magnified image of the surface of the polishing pad 100 according to some embodiments of the present invention before the CMP process, and lower image of FIG. 4B is a magnified image of the surface of the polishing pad 100 according to some embodiments of the present invention after the CMP process.

Comparing lower images of FIG. 4A and FIG. 4B, in the case of forming the polyurethane by mixing the polypropylene glycol having tetravalent or more functional group according to some embodiments of the present invention, the shape of the pore 141' is maintained on the surface of the polishing pad 100 after the CMP process and the glazing is not generated on the pore 141', compared to the case of the conventional method.

The polishing performance should be maintained in a constant manner for the lifetime of the polishing pad 100 in the CMP process. When the pore on the polishing pad 100 is blocked and the glazing is generated, the polishing performance is gradually degraded, and eventually, the lifetime of the polishing pad 100 is limited. However, if the shape of the pore is constantly maintained as in the case of the present invention, the polishing performance of the polishing pad 100 is constantly maintained without being degraded, and eventually, the lifetime of the polishing pad 100 is ensured and the cost for replacing the polishing pad 100 can be saved accordingly.

The prepolymer is produced in the middle stage of producing the polymer matrix 130. In some embodiments of the present invention, the viscosity of such a prepolymer is 20,000 cps (at 25° C.) to 40,000 cps (at 25° C.).

The viscosity of the prepolymer determines the size of the pore together with the inert gas and the low-boiling blowing agent for producing the porous pore in the polishing layer 120, which will be described in detail later.

The polishing layer 120 includes the porous pore. The porous pore is produced by mixing the inert gas and the low-boiling blowing agent, as is described in detail later, and if the other conditions are the same, the size of the pore is controlled by a ratio of the inert gas and the low-boiling blowing agent in the mixture.

In this manner, the polishing layer 120 includes the porous pore, and on the surface of the polishing layer 120, which comes in direct contact with the wafer 7, a plurality of opened minute pores 141' defined by such porous pores 141 is arranged.

The pore 141' being opened and defined by the porous pore 141 means that the porous pore from the inert gas and the low-boiling blowing agent in the polishing layer 120 is exposed to the outside so that a corresponding pore area is left as the pore 141' being capable of capturing a predetermined material from the outside.

With the polishing pad 100 worn in the polishing process, the embedded porous pores 141 are continuously exposed to the surface of the polishing layer 120 to form the pores 141', which are replaced by the polishing slurry 13. Therefore, as the polymer matrix 130 that is the material of the polishing layer 120 exists only on the surface, the polishing pad 100 is prevented from being nonuniformly worn and the silicon wafer 7 that is a polishing target can be uniformly polished.

In some embodiments of the present invention, the porous pores included in the polishing pad 100 are produced from the inert gas and the low-boiling blowing agent as described above.

The inert gas means a chemically stable gas with the atomic valence of zero, including helium (He), neon (Ne), argon (Ar), krypton (Kr), xenon (Xe), radon (Rn), and the like. Further, the inert gas includes all gases that does not react with the polymer matrix 130, e.g., not contributing to the urethane reaction, such as $N_2$ gas, as well as group 8 elements on the periodic table.

The blowing agent generates considerable amount of foams from thermal vaporization or reaction when mixed with a predetermined base material, which can be roughly divided into chemical blowing agent and a physical blowing agent.

The chemical blowing agent foams with carbon dioxide generated by a reaction with water or the like by using activation of isocyanate group, and hence the water is used as the foaming agent. The physical blowing agent forms bubbles by generating a reaction heat by mixing a gas or using a decomposing or vaporizing foaming agent, and hence it does not contribute to a polymer reaction. Types and features of such blowing agents are already known, and hence a further explanation thereof is omitted.

In some embodiments of the present invention, among such blowing agents, a low-boiling blowing agent having a boiling point of 60° C. to 150° C. is employed, and a further explanation thereof is given later.

It is preferred that the size of the pores be uniform in the polishing pad 100. In addition, in order to support the latest micro process in the semiconductor field, pores having minute size in the order of micrometers (particularly, 31 μm or smaller) needs to be produced.

That is, the conventional technique or a general method cannot satisfy such requirements. However, the present invention meets such requirements with the above-mentioned structure.

An example of the method of manufacturing the polishing pad 100 according to some embodiments of the present invention and an effect thereof are described below.

First, the urethane prepolymer having the viscosity of 20,000 cps (at 25° C.) to 40,000 cps (at 25° C.) is produced by mixing a plurality of polymers.

The process of producing the urethane prepolymer itself is a general technique; however, in the present embodiments, the viscosity of the produced urethane prepolymer falls within a range of 20,000 cps (at 25° C.) to 40,000 cps (at 25° C.).

In particular, by producing the urethane prepolymer by mixing the polypropylene glycol having tetravalent or more functional group, the urethane prepolymer having the three-dimensional bonding structure is produced by mixing the urethane prepolymer and the curing agent. The effect of the three-dimensional structure is as described earlier.

Thereafter, the inert gas and the low-boiling blowing agent having the boiling point of 60° C. to 150° C. is mixed with the urethane prepolymer.

At this time, the ratio of mixing the inert gas and the low-boiling blowing agent is 5% to 40% of the inert gas and 0.1% to 10% of the low-boiling blowing agent with reference to the total volume of the produced mixture.

Thereafter, gelation and curing processes are performed (Step S110). That is, the mixture is solidified by putting the mixture in a case having a predetermined shape and performing the gelation and curing processes. The gelation process is performed for 5 minutes to 30 minutes at the temperature of 80° C. to 90° C., and the curing process is performed for 20 hours to 24 hours at the temperature of 80° C. to 120° C. However, it is a matter of course that the specific process temperature and time can be modified as appropriate to find the optimum condition.

Lastly, an output product cured in a predetermined shape is processed (Step S120). The process includes removal from the case, cutting and treatment of the surface.

First, the cured product is removed from the cast and cut to have predetermined thickness and shape. In order to improve the productivity, the polishing layer 120 can be formed in a sheet shape by using a known method in the field of manufacturing a polymer sheet, such as casting and press molding. In addition, in some embodiments of the present invention grooves of various shapes are formed on the surface of the polishing layer 120 to uniformly supply the polishing slurry 13 to the surface of the polishing layer 120.

Although the polishing pad 100 can be completed with the polishing layer 120 only, the support layer 110 can be provided by using a known method in the field of manufacturing the polishing pad 100 and the support layer 110 can be coupled with the polishing layer 120 to complete the polishing pad 100 as appropriate.

The polishing layer 120 produced in the above manner includes pores having minute and uniform sizes that cannot be compared with the conventional case.

Figure 5:
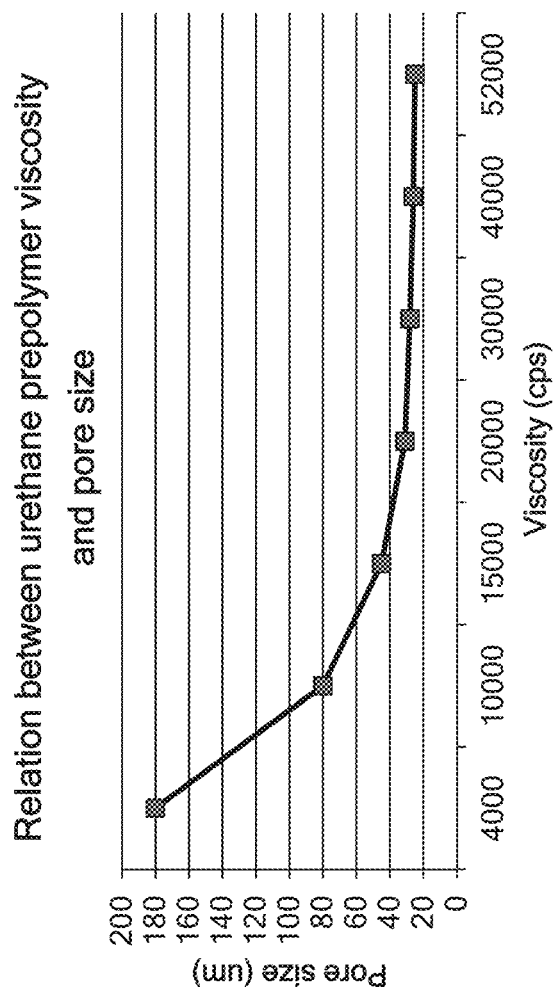
FIG. 5 is a graph showing a relation between viscosity of urethane prepolymer and pore size according to some embodiments of the present invention.
Figure 6:
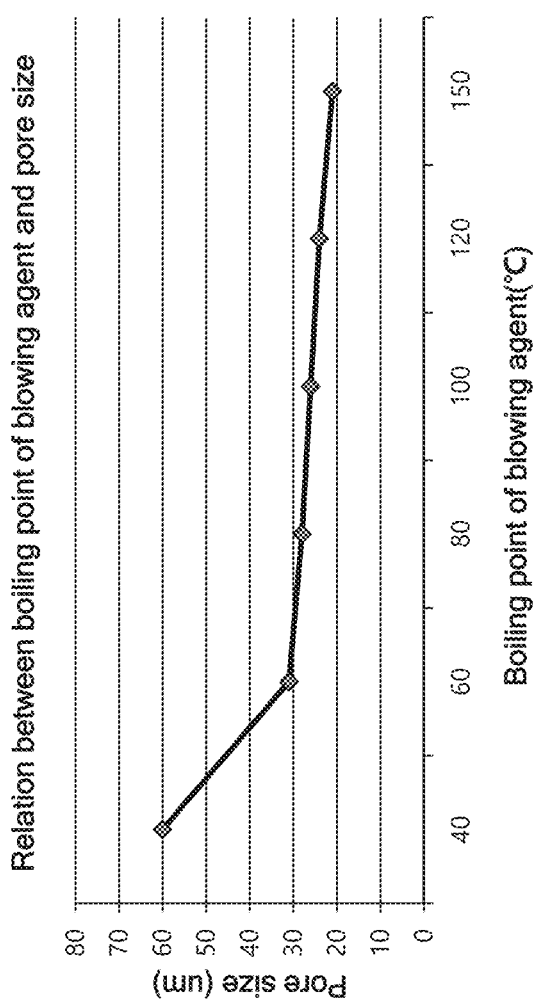
FIG. 6 is a graph showing a relation between boiling point of blowing agent and pore size according to some embodiments of the present invention.
Figure 7:
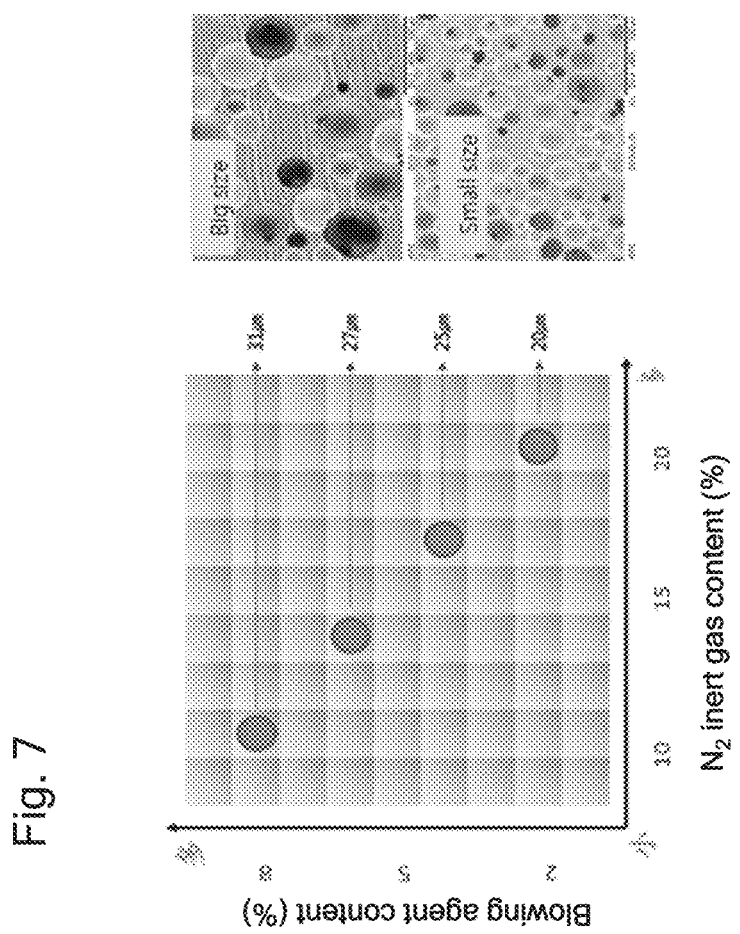
FIG. 7 is a set of images showing a relation between inert gas content and pore size according to some embodiments of the present invention.

FIG. 5 is a graph showing a relation between the viscosity of the urethane prepolymer and the size of the pore (that is produced in the polishing layer 120) when the content of the inert gas is 5%, the content of the blowing agent is 10%, and the boiling point of the blowing agent is 60° C. FIG. 6 is a graph showing a relation between the viscosity of the blowing agent and the size of the pores when the viscosity of the urethane prepolymer is 20,000 cps (at 25° C.), the content of the inert gas is 5%, the content of the blowing agent is 10%. FIG. 7 is an image showing a relation between the content of the inert gas and the size of the pore.

As shown in FIG. 5, the average pore size produced when the viscosity of the urethane prepolymer is 4,000 cps is 180 μm, when the viscosity of the urethane prepolymer is 10,000 cps is 80 μm, when the viscosity of the urethane prepolymer is 15,000 cps is 45 μm, when the viscosity of the urethane prepolymer is 20,000 cps is 31 μm, when the viscosity of the urethane prepolymer is 30,000 cps is 26 μm, when the viscosity of the urethane prepolymer is 40,000 cps is 26 and when the viscosity of the urethane prepolymer is 52,000 cps is 25 μm.

That is, it has been found that the pores having sizes of 30 μm or smaller can be produced when the viscosity of the urethane prepolymer is 20,000 cps (at 25° C.) or higher.

Further, when the viscosity of the urethane prepolymer is 40,000 cps (at 25° C.) or higher, the urethane prepolymer is not practically controllable due to the excess viscosity. In order to control the urethane prepolymer having such an excess viscosity requires considerable increase of the cost in the equipment side, and hence it is preferred to maintain the viscosity of the urethane prepolymer to 40,000 cps (at 25° C.) or lower.

As shown in FIG. 6, the average pore size when the boiling point of the blowing agent is 40° C. is 60 μm, when the boiling point of the blowing agent is 60° C. is 31 μm, when the boiling point of the blowing agent is 80° C. is 28 μm, when the boiling point of the blowing agent is 100° C. is 26 μm, when the boiling point of the blowing agent is 120° C. is 24 μm, and when the boiling point of the blowing agent is 150° C. is 21 μm.

That is, it has been found that the pores having sizes of 30 μm or smaller can be produced when the viscosity of the boiling point of the blowing agent is 60° C. or higher. When the boiling point of the blowing agent 150° C. or higher, the reaction time is considerably increased due to a decrease of the foaming speed and the number of pores produced by the foaming is decreased, which degrades the efficiency of collecting the slurry by the polishing pad.

Therefore, it is preferred to use the blowing agent having the boiling point of 150° C. or lower.

As shown in FIG. 7, the pore size is changed with change of the ratio of the inert gas and the low-boiling blowing agent. When the content of the inert gas is 5% or higher and the content of the low-boiling blowing agent is 10% or lower, pores having sizes of 31 μm or smaller are produced. When the volume ratio of the inert gas exceeds 30, the specific gravity of the polishing pad is lowered, which degrades the polishing efficiency in the characteristic function, i.e., the polishing function, of the polishing pad. Therefore, the volume ratio of the inert gas needs to be maintained to 30% or lower.

The low-boiling blowing agent needs to be mixed with the volume ratio of at least 0.1% or higher. When the volume ratio of the low-boiling blowing agent is lower than 0.1%, uniform and minute pores cannot be produced as if there exists the inert gas only.

In this case, pores having the size exceeding 31 μm are mainly produced, and hence the mixing volume ratio of the low-boiling blowing agent needs to be at least 0.1% or higher.

Specific experimental examples of the present invention are described below with comparison. Contents not described here can be technically understood by people having ordinary skill in the pertinent art, and therefore the explanations thereof will be omitted. It is a matter of course that these experimental examples should not be construed to limit the scope of the present invention.

Experimental Example 1

Polytetramethylene glycol (molecular weight 1000) 70 kg, polypropylene glycol (molecular weight 1000) 30 kg, toluene disocyanate 60 kg were put into a 200-kg reactor and allowed to react for 4 hours to 5 hours at the temperature of 70° C. to 80° C., from which isocyanate prepolymer having NCO content of the final product of 9.0% was produced.

The viscosity of the produced isocyanate prepolymer was 35,000 cps (at 25° C.).

Experimental Example 2

Polytetramethylene glycol (liquid ratio of molecular eight 1000:800=8:2) 80 kg, polypropylene glycol (liquid ratio of molecular weight 1000:2000=5:5, functional group f=4) 20 kg, toluene disocyanate 67 kg were put into a 200-kg reactor and allowed to react for 4 hours to 5 hours at the temperature of 70° C. to 80° C., from which isocyanate prepolymer having NCO content of the final product of 9.0% was produced. The viscosity of the produced isocyanate prepolymer was 30,000 cps (at 25° C.).

Experimental Example 3

The isocyanate prepolymer of the experimental example 1 100 kg and MOCA 29 kg were discharged through a mixing head by using a casting machine. At this time, $N_2$ gas as the inert gas was supplied to the mixing head with the volume ratio of 30%.

Thereafter, the mixture was immediately injected into a square-shaped cast. The injected reaction solution was put in a gelation process for 30 minutes with 1 minute of tack free time (TFT), and cured in a 100° C. oven for 20 hours.

The cured product was removed from the cast, and the polishing layer 120 of the polishing pad 100 was produced by cutting the surface.

Figure 8A:
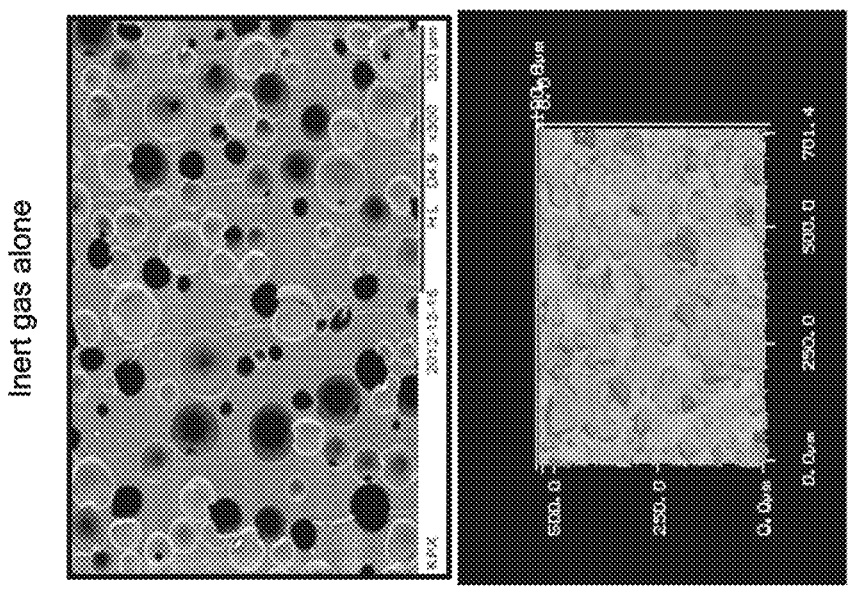
FIG. 8A is a set of images showing pore size in a polishing pad manufactured by the conventional method.

The average pore size of the surface of the polishing layer 120 was about 40 μm or larger. The pore image is as shown in FIG. 8A. This is the one produced by the conventional method, and the polishing performance, the lifetime, and the like of the polishing pad 100 manufactured in this manner are shown in FIGS. 9 and 10.

Figure 9:
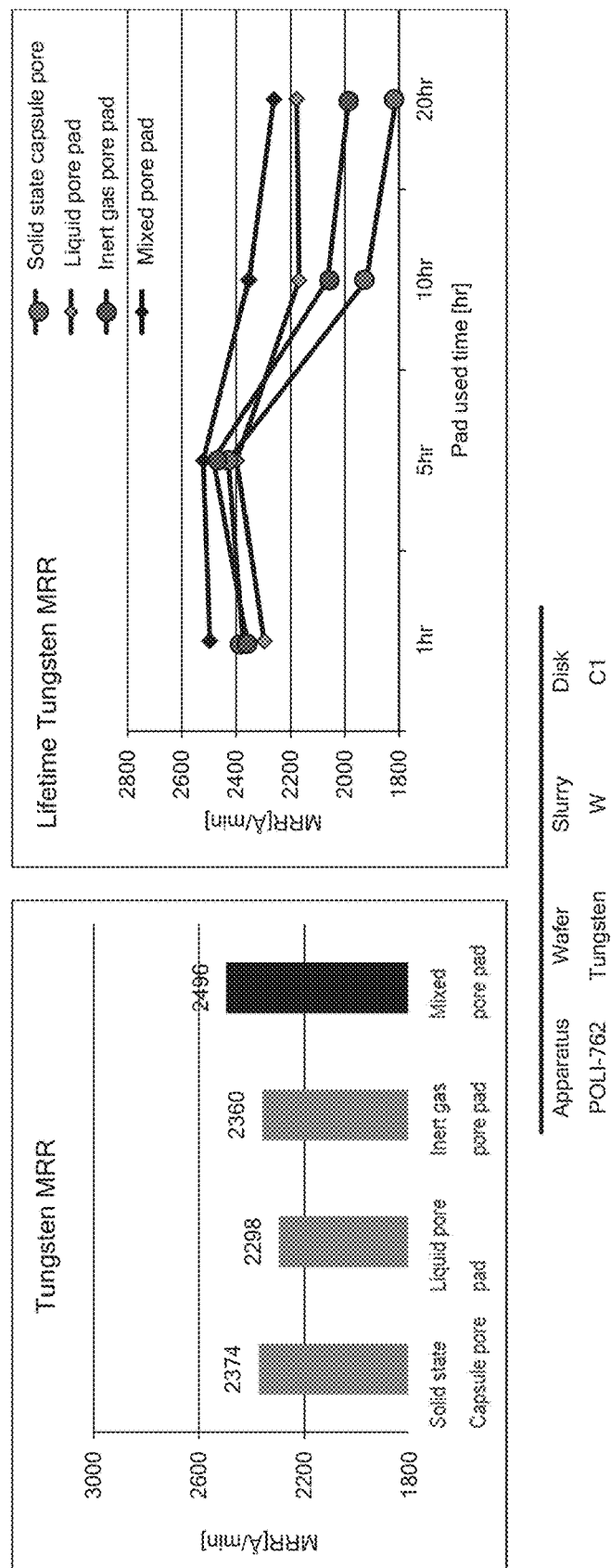
FIG. 9 is a set of graphs showing polishing performance and lifetime of a polishing pad manufactured by the conventional method and polishing performance and lifetime of a polishing pad manufactured by some embodiments of the present invention.
Figure 10:
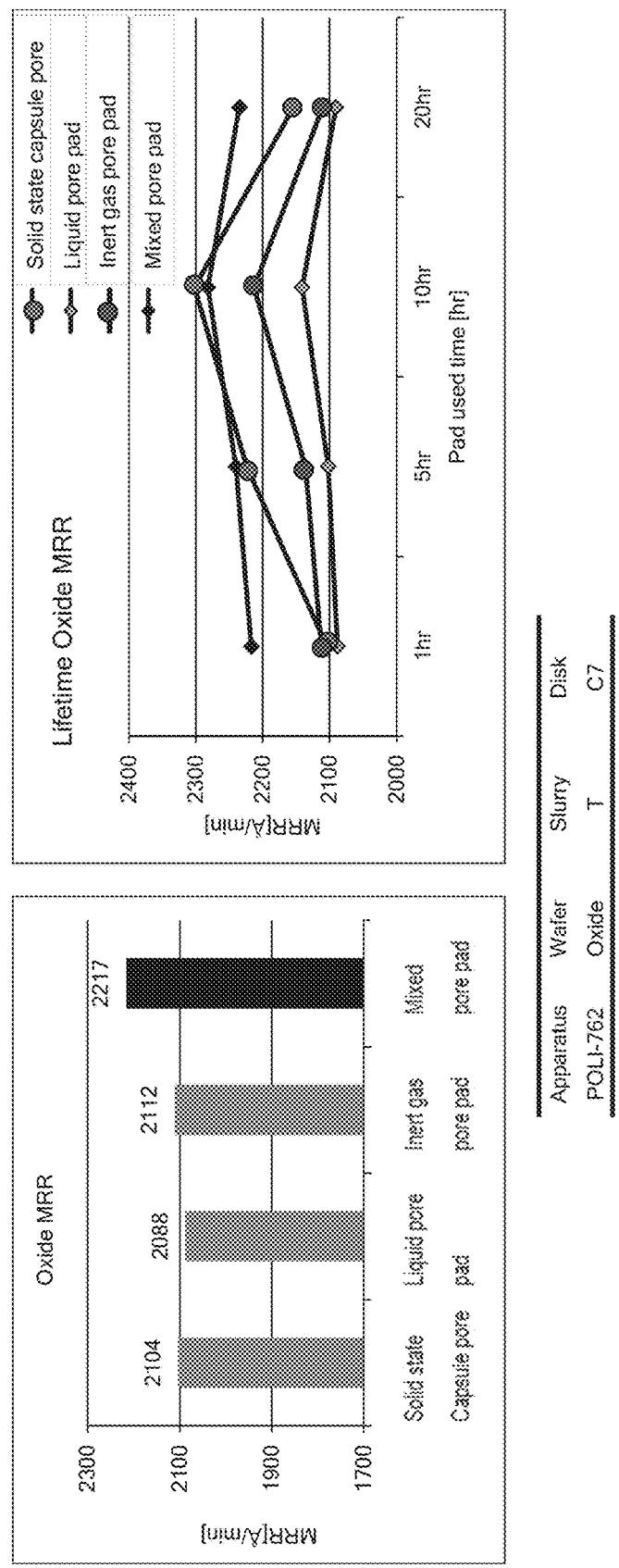
FIG. 10 is a set of graphs showing polishing performance and lifetime of a polishing pad manufactured by the conventional method and polishing performance and lifetime of a polishing pad manufactured by some embodiments of the present invention.

FIGS. 9 and 10 also show the performance data of polishing pads including solid-state capsule pores and liquid-state pores manufactured by the conventional method as well as those of the experimental example 3.

Experimental Example 4

The isocyanate prepolymer of the experimental example 2 100 kg, MOCA 29 kg, the inert gas, and the low-boiling blowing agent were discharged through a 5,000-rpm mixing head by using a casting machine. At this time, $N_2$ gas as the inert gas and the low-boiling blowing agent were supplied to the mixing head with the volume ratio of 10% and 8%, respectively.

Thereafter, the mixture was immediately injected into a square-shaped cast. The injected reaction solution was put in a gelation process for 30 minutes with 1 minute of TFT, and cured in a 100° C. oven for 20 hours. The cured product was removed from the cast, and the polishing layer 120 of the polishing pad 100 was produced by cutting the surface.

Figure 8B:
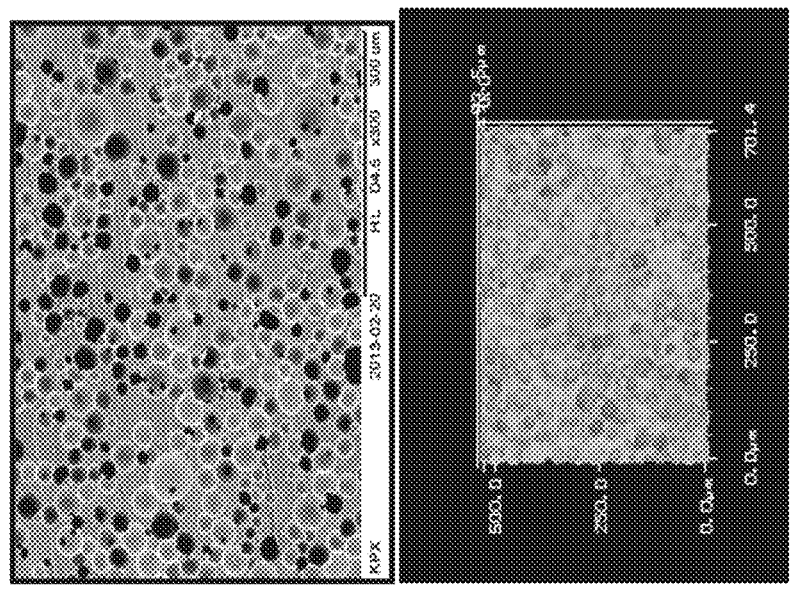
FIG. 8B is a set of images showing pore size in a polishing pad manufactured by some embodiments of the present invention.
Figure 11:
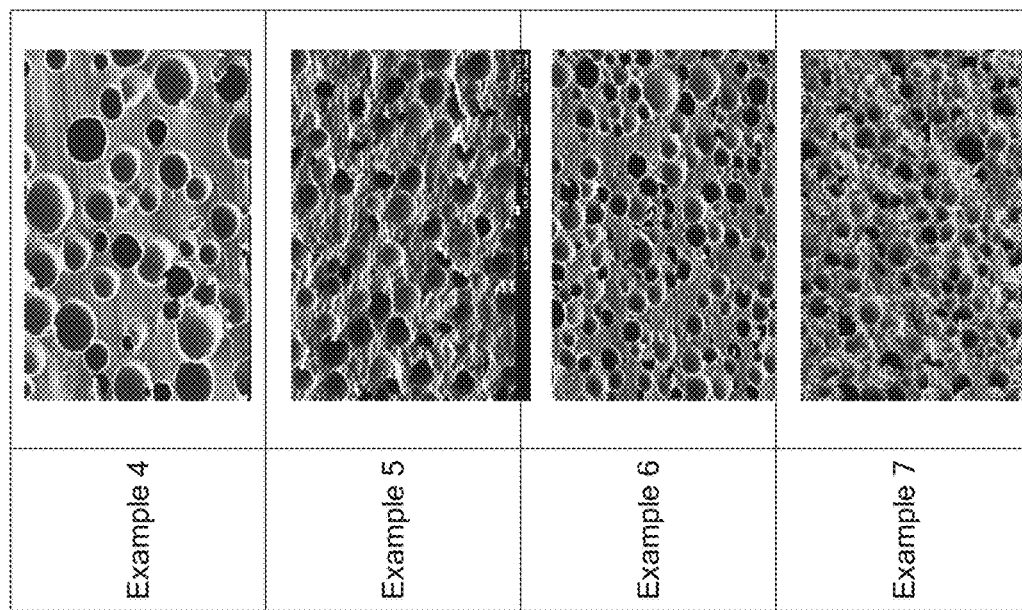
FIG. 11 is a set of images showing states of pores produced by some embodiments of the present invention.

The average pore size of the surface of the polishing layer 120 was about 29 μm. The pore image is as shown in FIGS. 8(b) and 11. Comparing the images shown in FIGS. 8B and 8A, the image shown in FIG. 8B exhibits smaller average size of the pore and considerably uniform change of the size. That is, even with the conventional method as shown in FIG. 8A, pores having sizes of 31 μm or smaller can be produced among the pores; however, the size of the pores is not uniform including considerably large pores, and eventually, the average size is increased.

Consequently, the average size of produced pores can be 31 μm or smaller and as uniform as possible only when the specific condition according to the present invention is met.

Experimental Example 5

The isocyanate prepolymer of the experimental example 2 100 kg, MOCA 29 kg, the inert gas, and the low-boiling blowing agent were discharged through a 5,000-rpm mixing head by using a casting machine. At this time, $N_2$ gas as the inert gas and the low-boiling blowing agent were supplied to the mixing head with the volume ratio of 15% and 6%, respectively.

Thereafter, the mixture was immediately injected into a square-shaped cast. The injected reaction solution was put in a gelation process for 30 minutes with 1 minute of TFT, and cured in a 100° C. oven for 20 hours. The cured product was removed from the cast, and the polishing layer 120 of the polishing pad 100 was produced by cutting the surface.

The average pore size of the surface of the polishing layer 120 was about 27 μm. The pore image is as shown in FIG. 11. The polishing performance and the lifetime performance are shown in FIGS. 9 and 10.

Experimental Example 6

The isocyanate prepolymer of the experimental example 2 100 kg, MOCA 29 kg, the inert gas, and the low-boiling blowing agent were discharged through a 5,000-rpm mixing head by using a casting machine. At this time, $N_2$ gas as the inert gas and the low-boiling blowing agent were supplied to the mixing head with the volume ratio of 18% and 4%, respectively.

Thereafter, the mixture was immediately injected into a square-shaped cast. The injected reaction solution was put in a gelation process for 30 minutes with 1 minute of TFT, and cured in a 100° C. oven for 20 hours. The cured product was removed from the cast, and the polishing layer 120 of the polishing pad 100 was produced by cutting the surface.

The average pore size of the surface of the polishing layer 120 was about 24 μm. The pore image is as shown in FIG. 11.

Experimental Example 7

The isocyanate prepolymer of the experimental example 2 100 kg, MOCA 29 kg, the inert gas, and the low-boiling blowing agent were discharged through a 5,000-rpm mixing head by using a casting machine. At this time, $N_2$ gas as the inert gas and the low-boiling blowing agent were supplied to the mixing head with the volume ratio of 20% and 2%, respectively.

Thereafter, the mixture was immediately injected into a square-shaped cast. The injected reaction solution was put in a gelation process for 30 minutes with 1 minute of TFT, and cured in a 100° C. oven for 20 hours. The cured product was removed from the cast, and the polishing layer 120 of the polishing pad 100 was produced by cutting the surface.

The average pore size of the surface of the polishing layer 120 was about 21 μm. The pore image is as shown in FIG. 11.

From the result of evaluating the polishing performance and the lifetime performance for Ceria Slurry and W slurry processes shown in FIGS. 9 and 10, the polishing pad 100 manufactured by mixing the inert gas and the low-boiling blowing agent according to some embodiments of the present invention shows excellent polishing characteristics and excellent lifetime performance, compared to the polishing pad manufactured by the conventional method.

Figure 12A:
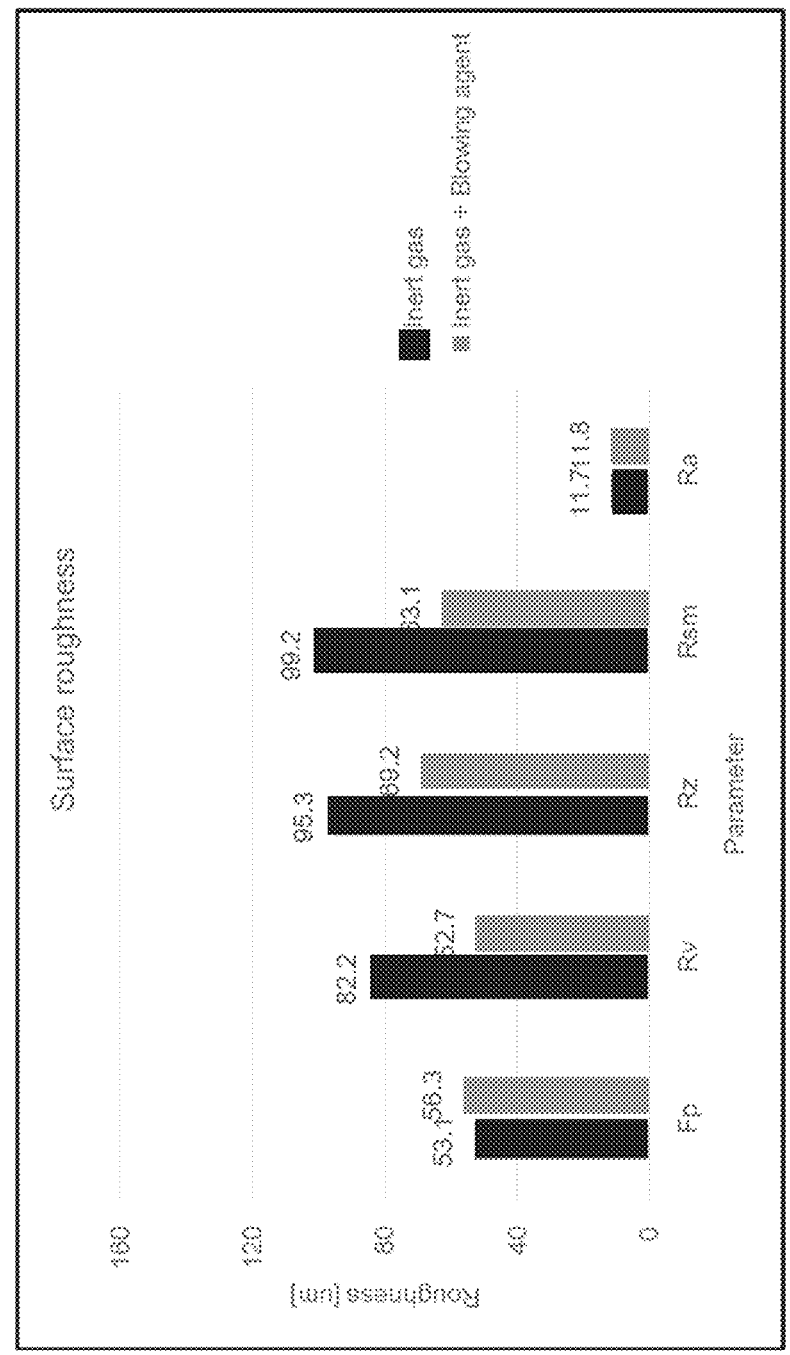
FIGS. 12A, 12B and 12C are a set of graphs showing surface roughness and scratch-related result in a process of forming a polishing pad according to the conventional method and surface roughness and scratch-related result in a process of forming a polishing pad according to some embodiments of the present invention.

Further, the pores can be produced in the polishing pad with smaller and more uniform size according to some embodiments of the present invention, which allows a distance between the pores to be shortened. As shown in FIG. 12A, compared to the case of employing the inert gas only as in the conventional method, when both the inert gas and the blowing agent are employed at the same time according to some embodiments of the present invention, the Rsm value can be lowered on the surface roughness parameter to expect enhancement of the CMP performance of the polishing pad.

Figure 12B:
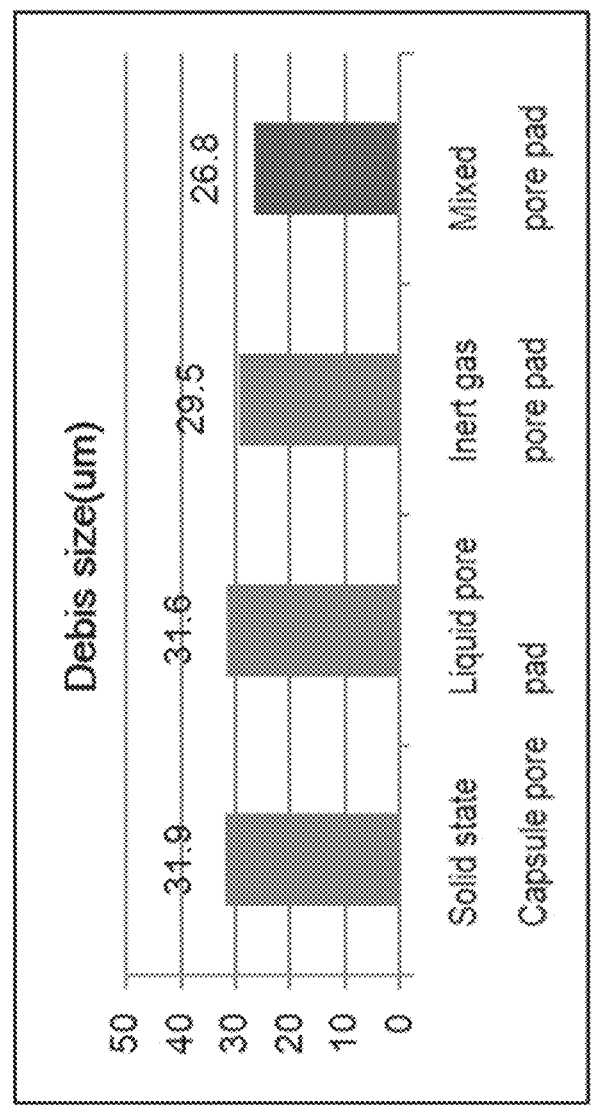
Figure 12C:
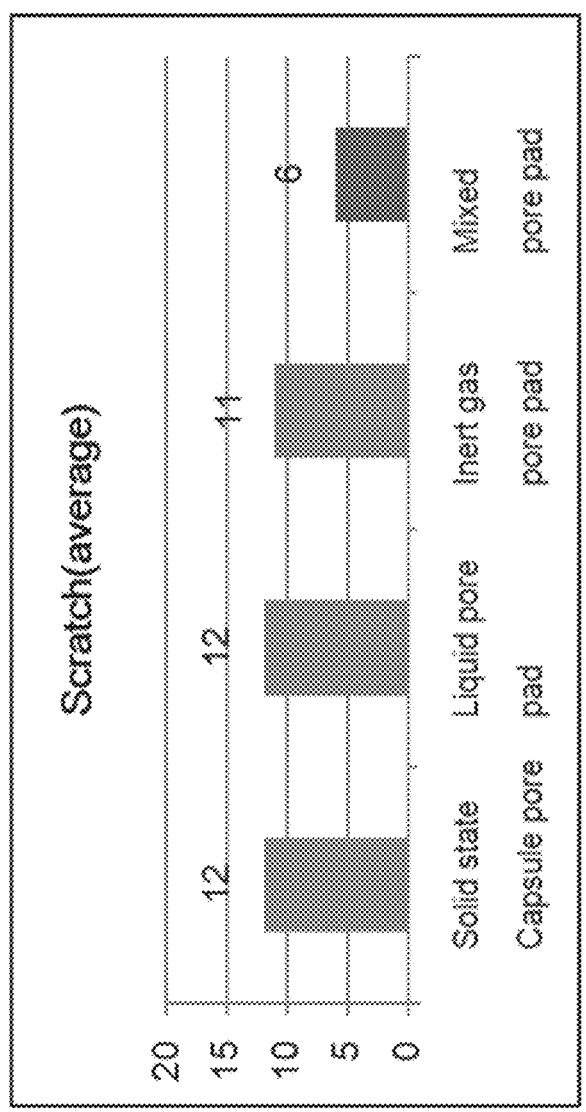

Such a lowered Rsm value allows the pad wear debris size generated during the CMP process to be decreased as shown in FIG. 12B and defect and scratch to be reduced as shown in FIG. 12C, leading to an increase of the semiconductor production yield. In FIGS. 12B and 12C, "Mixed pore" indicates the case of employing both the inert gas and the blowing agent at the same time according to some embodiments of the present invention.

In the above-mentioned experimental examples, the temperature of mixing the inert gas and the low-boiling blowing agent can be selected in a range from 60° C. to 150° C.

It is an object of the present invention to provide a method of manufacturing a polishing pad that can collect polishing slurry with a uniform and minute size and maximize the polishing performance and the flattening performance.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A method of manufacturing a polishing pad, the method comprising:
   (a) producing an urethane prepolymer having a viscosity of 20,000 cps (at 25° C.) to 40,000 cps (at 25° C.) by mixing a plurality of polymer molecules, wherein the plurality of polymer molecules comprises a polymer having four or more hydroxyl groups, and an amount of the polymer having four or more hydroxyl groups ranges from 1% to 30% based on a total weight of the urethane prepolymer;
   (b) mixing the urethane prepolymer produced at the producing step (a) with an inert gas and a low-boiling blowing agent having a boiling point of 60° C. to 150° C.; and
   (c) manufacturing a polishing layer including porous pores by causing a mixture produced at the mixing step (b) to be subjected to gelation and curing in a predetermined cast,
   wherein, the mixing step (b) includes causing an average size of pores produced by mixing the inert gas of 5% to 30% and the low-boiling blowing agent of 0.1% to 10% of a total volume of a mixture produced at the mixing step (b) with the urethane prepolymer produced at the producing step (a) to be 31 μm or smaller.

2. The method according to claim 1, wherein,
   the manufacturing step (c) includes manufacturing the polishing layer with a generation of a glazing phenomenon suppressed by forming a polyurethane having a three-dimensional bonding structure by mixing the urethane prepolymer produced at the producing step (a) and a curing agent.

3. The method according to claim 2, wherein, the plurality of polymer molecules includes any one selected from the group consisting of polypropylene glycol, polyurethane, polyether, polyester, polysulfone, polyacrylic, polycarbonate, polyethylene, polymethyl methacrylate, polyvinyl acetate, polyvinyl chloride, polyethyleneimine, polyethersulfone, polyetherimides, polyketone, melamine, nylon, fluorohydrocarbon, and any combination thereof.

4. The method according to claim 1, further comprising opening the porous pores on a surface of the polishing layer by processing the polishing layer.

5. The method according to claim 1, wherein the polymer having four or more hydroxyl groups is a polypropylene glycol having four or more hydroxyl groups.

6. The method according to claim 5, wherein the plurality of polymer molecules further comprises toluene disocyanate and polytetramethylene glycol.

* * * * *